(12) United States Patent
Strecker et al.

(10) Patent No.: US 11,407,446 B2
(45) Date of Patent: Aug. 9, 2022

(54) METHOD AND DEVICE FOR OPERATING A STEERING SYSTEM FOR A MOTOR VEHICLE, STEERING SYSTEM

(71) Applicant: Robert Bosch GmbH, Stuttgart (DE)

(72) Inventors: Joerg Strecker, Pluederhausen (DE); Roland Greul, Schwaebisch Gmuend (DE); Alexander Sauter, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 16/956,160

(22) PCT Filed: Dec. 12, 2018

(86) PCT No.: PCT/EP2018/084431
§ 371 (c)(1),
(2) Date: Jun. 19, 2020

(87) PCT Pub. No.: WO2019/134795
PCT Pub. Date: Jul. 11, 2019

(65) Prior Publication Data
US 2020/0361531 A1 Nov. 19, 2020

(30) Foreign Application Priority Data
Jan. 4, 2018 (DE) .................... 10 2018 200 094.8

(51) Int. Cl.
*B62D 6/00* (2006.01)
*B62D 5/00* (2006.01)
*B62D 5/04* (2006.01)

(52) U.S. Cl.
CPC ............ *B62D 6/008* (2013.01); *B62D 5/006* (2013.01); *B62D 5/0463* (2013.01); *B62D 5/0472* (2013.01); *B62D 6/002* (2013.01)

(58) Field of Classification Search
CPC ...... B62D 6/008; B62D 5/006; B62D 5/0463; B62D 5/0472; B62D 6/002
(Continued)

(56) References Cited

U.S. PATENT DOCUMENTS

2004/0211618 A1* 10/2004 Ogawa .................. B62D 6/008
180/402
2007/0257461 A1 11/2007 Lutz
(Continued)

FOREIGN PATENT DOCUMENTS

DE    100 21 814 A1   11/2001
DE    100 51 187 A1    1/2002
(Continued)

OTHER PUBLICATIONS

International Search Report corresponding to PCT Application No. PCT/EP2018/084431, dated Mar. 25, 2019 (German and English language document) (7 pages).

*Primary Examiner* — Scott A Reinbold
(74) *Attorney, Agent, or Firm* — Maginot, Moore & Beck LLP

(57) ABSTRACT

The disclosure relates to a method for operating a steering system for a motor vehicle, which steering system has, on the one hand, a steering handle which can be operated by a driver of the motor vehicle, and a hand torque adjuster which is assigned to the steering handle and is designed to apply a damper force, counteracting the operation by the driver, to the steering handle, and, on the other hand, a wheel angle adjuster which is coupled to at least one steerable wheel of the motor vehicle and which is electrically actuated as a function of operation of the steering handle in order to set a steering angle of the at least one wheel. There is provision
(Continued)

that the damper force is generated by the manual torque adjuster as a function of a current performance of the wheel angle adjuster.

13 Claims, 2 Drawing Sheets

(58) Field of Classification Search
USPC .......................................................... 701/41
See application file for complete search history.

(56) References Cited

U.S. PATENT DOCUMENTS

| 2008/0249685 | A1* | 10/2008 | Hara ..................... B62D 5/006 |
| | | | 701/42 |
| 2009/0024281 | A1 | 1/2009 | Hwang |
| 2020/0361530 | A1* | 11/2020 | Polmans ................ B62D 6/008 |
| 2021/0331736 | A1* | 10/2021 | Zientek .............. B62D 15/0215 |

FOREIGN PATENT DOCUMENTS

| DE | 101 22 153 A1 | 11/2002 | |
| DE | 10 2006 036 744 A1 | 2/2008 | |
| DE | 10 2010 048 991 A1 | 4/2012 | |
| DE | 10 2014 117 718 A1 | 6/2016 | |
| EP | 1 256 507 A2 | 11/2002 | |
| EP | 1256507 A2 * | 11/2002 | ............. B62D 6/008 |
| EP | 1 470 989 A2 | 10/2004 | |
| EP | 3 187 395 A1 | 7/2017 | |
| JP | 2001-253353 A | 9/2001 | |
| JP | 2005-335710 A | 12/2005 | |
| JP | 2006-168454 A | 6/2006 | |
| JP | 2006-193083 A | 7/2006 | |
| JP | 2006-298274 A | 11/2006 | |
| JP | 2006-347286 A | 12/2006 | |
| JP | 2007-230472 A | 9/2007 | |
| JP | 2010-280313 A | 12/2010 | |
| JP | 2013-212837 A | 10/2013 | |
| WO | 2006/064343 A2 | 6/2006 | |
| WO | 2016/031058 A1 | 3/2016 | |

* cited by examiner

METHOD AND DEVICE FOR OPERATING A STEERING SYSTEM FOR A MOTOR VEHICLE, STEERING SYSTEM

This application is a 35 U.S.C. § 371 National Stage Application of PCT/EP2018/084431, filed on Dec. 12, 2018, which claims the benefit of priority to Serial No. DE 10 2018 200 094.8, filed on Jan. 4, 2018 in Germany, the disclosures of which are incorporated herein by reference in their entirety.

The disclosure relates to a method for operating a steering system for a motor vehicle which, on the one hand, has a steering handle operated by a driver of the motor vehicle, in particular the steering wheel or steering lever, and a hand torque adjuster assigned to the steering handle, which is designed to exert a damping force on the steering handle which counteracts the operation by the driver, and, on the other hand, a wheel angle adjuster coupled to at least one steerable wheel of the motor vehicle, which is electrically controlled to adjust a steering angle of at least one wheel, as a function of the operation of the steering handle.

Furthermore, the disclosure relates to an apparatus for carrying out the above method as well as a steering system which has such an apparatus.

BACKGROUND

Steering systems in which a direct mechanical coupling between the wheels to be steered and the steering handle to be operated by the user is interrupted are referred to as steer-by-wire steering systems because the control of the wheel steering angle is carried out electrically. With use of the Steer-by-wire technology there is a degree of freedom that allows the steering handle to move independently of the wheel to be steered. In normal operation, the hand torque adjuster exerts a force counteracting the driver on the steering handle to create a steering feel to simulate the feedback with the wheels to be steered. This force will be overlaid with a damping force or a damping torque if necessary, in particular when the steering rate leaves a permissible range. As a result, the driving feel for the driver is optimized, in particular by simulating the driving feel of a conventional mechanical steering system.

From the disclosure notice DE 100 21 814 Al, such a steering system is known, in which, in addition, in the event of a failure of the hand torque adjuster the adjustment movement of the steering handle is actively damped by exerting a damping force on the steering handle, which as a damping torque counteracts the operating force or the operating torque of the user or the driver. In the event of a failure of the hand torque adjuster, a damping torque between the rotor and the stator of the electromotive hand torque adjuster is generated by a separate circuit arrangement. From the disclosure notice DE 100 51187 Al, a steering system is known that maintains the operation of the steering system even in the event of failure of the hand torque adjuster. For this purpose, a spring element and a damping element are provided, which act on the steering handle to influence the adjustment rate of the steering handle. US 2007/0257461 Al also discloses a damper system for a steer-by-wire steering system and the disclosure notice WO 2016/031058 Al discloses a steering system in which a deviation between the steering wheel movement and the wheel angle adjustment is to be prevented.

SUMMARY

The method according to the disclosure has the advantage that the steering feeling for the driver is further improved and thus the driving safety and controllability are optimized. According to the disclosure, this is achieved by a method in which the damper force generated by the hand torque adjuster is generated as a function of a current performance of the wheel angle adjuster. When controlling the hand torque adjuster, it is thus taken into account to what extent the wheel angle adjuster is able to implement a steering angle specified by the steering handle on at least one wheel. As a result, the driver is automatically provided with feedback or a response regarding the extent to which the steering torque or the steering angle requested by him is implemented. In particular, with decreasing performance of the wheel angle adjuster, the damping force is increased by the hand torque adjuster, so that the driver intuitively perceives that reaching the desired steering angle on the at least one wheel requires the operation of the steering handle with increased operating torque or with increased operating force.

According to a preferred embodiment of the disclosure, the performance is determined as a function of a difference between an adjusted actual wheel angle and a setpoint wheel angle of the wheel that is to be adjusted. The setpoint wheel angle is specified to the wheel angle adjuster as the target variable and the actual wheel angle is continuously monitored in order to be able to compare the two. With increasing difference a decreasing performance of the wheel angle adjuster is detected and the damper force preferably increases to achieve the above-mentioned effect.

According to a further embodiment of the disclosure, it is preferably provided that the performance is determined as a function of an adjusted control torque and a setpoint torque of the wheel angle adjuster. Here it is monitored whether the wheel angle adjuster is able to provide the adjustment torque necessary to reach the setpoint wheel angle. If the adjusted control torque does not correspond to the expected setpoint torque, decreased performance is detected, and the damper force is increased accordingly. Here, signals of the wheel angle adjuster which are normally already available, and which reflect the adjusted control torque or the actual torque, can be used. For this purpose, for example, the operating current of the wheel angle adjuster is monitored and compared with an expected operating current.

Preferably, the damper force is determined as a function of an actuation torque exerted by the driver on the steering handle. This ensures that a damper force adapted to the operation of the steering handle is provided, which further improves the driving behavior for the driver. In particular, it is monitored whether an actuation torque is exerted on the steering handle at all.

Preferably, a damper force is generated only when an actuation torque is detected. If no actuation torque is detected, the actuation torque is thus zero, so the damper force is not generated. This prevents unintentional steering movements from being initiated by the hand torque adjuster itself. In addition, energy consumption is minimized.

According to a preferred further development of the disclosure, it is provided that the damper force is determined as a function of a speed of movement of the steering handle. As a result, the damper force is adapted to the operation by the user, making the haptic feedback through the damper force all the more natural for the driver, comparable to a mechanical steering system.

In particular, it is provided that the damper force is more attenuated with increasing speed of movement. As a result, an increased counter-torque opposes the driver when he actuates the steering handle faster, from which advantageous feedback to the driver results. The driver is also braked when actuating the steering handle in order to observe or "capture"

the difference between the setpoint wheel angle and the actual wheel angle. This results in particular from the fact that the damper force is determined as a function of the performance and the speed of movement of the steering handle. At high speeds of movement, the probability also increases of the actual wheel angle deviating from the setpoint wheel angle, so that the increased damper force is advantageous here in order to slow down the movement of the steering handle and thus the steerable wheel can comply with allowed tolerances as a result of the braking of the user or driver on the steering handle.

In particular, the increase in the damper force is continuous or stepwise. With a continuous increase, the damper force is increased correspondingly with increasing speed. If the increase is performed stepwise, different damper forces are noticeable by the driver with increasing speed of movement. As a result, for example, the driver will receive a notification of which speed range he is in. For an optimal driving experience, a continuous increase is preferred. In a further embodiment, a combination of a stepwise and continuous increase is provided, wherein then initially at low speeds of movement no increasing damper force is carried out, on exceeding a limit speed the damper force is first raised and is then continuously increased with further increasing speed of movement.

Furthermore, it is preferably provided that the damper force is influenced as a function of a vehicle speed and/or a gradient of the speed of movement or a wheel angle adjustment speed. This ensures a further optimization of the damper force and thus the driving feeling for the driver.

Furthermore, it is preferably provided that a transmission ratio between the steering handle and the wheel angle adjuster is adjusted as a function of the speed of movement of the steering handle. In the case of mechanical steering systems, a fixed transmission ratio between the steering handle and the adjusted wheel angle is provided, in which case there can be no deviation during operation. With the proposed embodiment it is achieved that the transmission ratio is adaptable during operation, so that the adjusted wheel angle changes in relation to the adjusted steering angle at the steering handle as a function of the speed of movement. In particular, it is provided that the transmission ratio is increased with increasing speed of movement of the steering handle and with an increasing setpoint steering angle starting from a neutral position.

In particular, when a predeterminable limit speed of the speed of movement is exceeded, the transmission ratio is increased. The limit speed, which is expediently greater than zero, thus serves as a triggering factor for initiating a change in the transmission ratio. Only when the limit speed is exceeded will the transmission ratio be increased.

Preferably, the transmission ratio is limited to a maximum value, in particular regardless of a speed of movement of the steering handle. As a result, it is ensured that the driver is not surprised by an unexpectedly large steering angle.

Furthermore, it is preferably provided that the transmission ratio is only increased when the steering handle is operated to increase a wheel angle. This means that when the steering handle is operated to reduce a wheel angle, the transmission ratio is not increased, regardless of the speed of movement. A reduction of the virtual and indirectly adjusted, increased transmission ratio takes place, for example, when the wheel steering angle passes through zero, when the wheel is moved from a deflected position to a neutral position or a position beyond the neutral position.

The apparatus according to the disclosure is characterized in that at least one control unit is specially prepared to carry out the method according to the disclosure when used as intended, that is when operating the motor vehicle. This results in the advantages already mentioned. According to a first embodiment, there is a control unit that operates both the hand torque adjuster as well as the wheel angle adjuster. Alternatively, according to a further embodiment, there are two control units, wherein one actuates the wheel angle adjuster and the other actuates the hand torque adjuster. In addition, according to a further embodiment, it is provided that a higher-level control unit is assigned to the two control units, which coordinates the two control units for operating the hand torque adjuster and the wheel angle adjuster. Further advantages and preferred features and combinations of features result from the previous description.

The steering system according to the disclosure is characterized by the apparatus according to the disclosure. The already mentioned benefits arise.

BRIEF DESCRIPTION OF THE DRAWINGS

The disclosure will be explained below in more detail on the basis of the drawing. In the figures.

DETAILED DESCRIPTION

Figure 1:
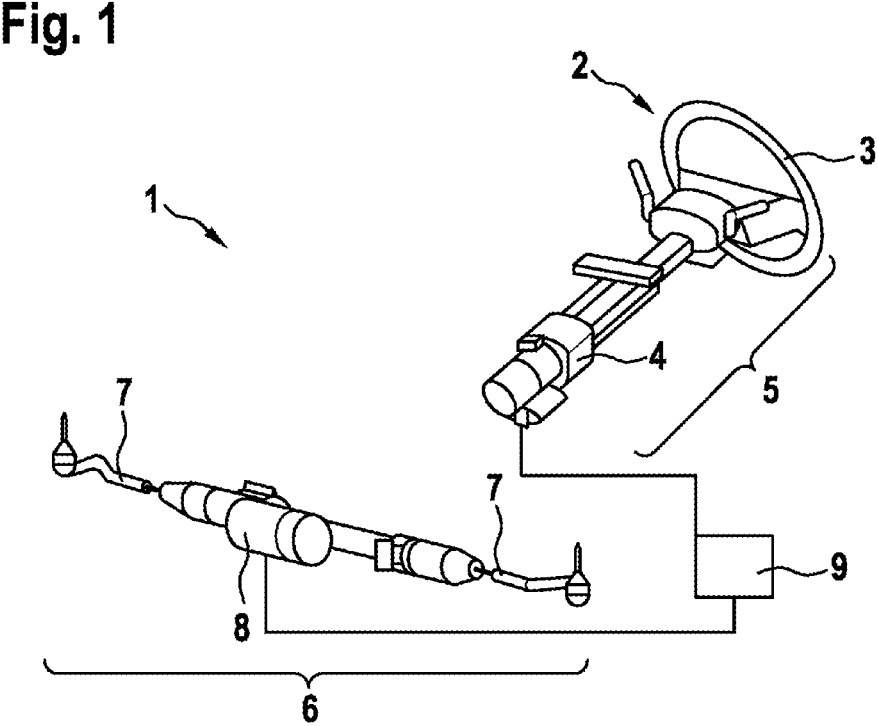
FIG. 1 shows a steering system for a motor vehicle in a simplified representation.

FIG. 1 shows in a simplified perspective representation an advantageous steering system 1, which has a steering handle 2 operated by a driver of a motor vehicle, which is designed according to the present embodiment as a rotatably mounted steering wheel 3. The steering handle 2 is mechanically connected to a hand torque adjuster 4, which is designed on the one hand to monitor the rotational position of the steering wheel 3 and on the other hand, if necessary, to exert a damping force on the steering handle 2, in the present case in the form of a damping torque, in order to counteract an operating torque applied to the steering wheel 3 by the driver. The steering handle 2 and the hand torque adjuster 4 together form a steering unit 5, which is assigned to the passenger compartment of the motor vehicle with the steering handle 2.

The steering system 1 further has a steering unit 6, which has at least one track rod 7 coupled or couplable to the pivotably mounted wheels of the motor vehicle, and to which a wheel angle adjuster 8 is assigned. The wheel angle adjuster 8, for example, has an electromotive actuator, by the actuation of which the track rod 7 is adjusted to set a desired wheel angle at the wheels. The wheel angle adjuster 8 is coupled to the steering unit 5 only by signaling means. For this purpose, in particular, there is a control unit 9, which has a signaling connection to both the hand torque adjuster 4 and the wheel angle adjuster 8. Depending on a captured rotation angle of the steering handle 2, the control unit 9 controls the wheel angle adjuster 8 in order to shift the track rod 7 in such a way that a setpoint wheel angle requested by the steering handle 2 is adjusted at the wheels by the wheel angle adjuster 8 and the shifting of the track rod 7. While there is only one control unit 9 according to the present exemplary embodiment, according to a further embodiment (not shown here) it is provided that there is a respective separate control unit both for the hand torque adjuster 4 and for the wheel angle adjuster 8, wherein the control units for example communicate with each other directly and/or are operated/ actuated by another higher-level control unit.

In the case of a steering movement, a deviation may occur between the setpoint wheel angle, which is specified by the steering handle 2, and the actually adjusted actual wheel angle. Here we are talking about a so-called phase build-up. Depending on the magnitude or steering frequency, the phase build-up can lead to a counter-phase in the steering movement at the steering wheel 3 and in the steering system 1. The consequences of this are that in a driving maneuver that requires a fast steering wheel movement, such as on a slalom course, or when catching an oversteering situation, the vehicle behavior is only controllable with difficulty. In order to avoid this, it is proposed in the present case that in order to prevent the difference between the setpoint wheel angle and the actual steering angle, the steering movement of the steering handle is attenuated correspondingly to the extent that the steering system 1 can follow the requested setpoint wheel angle. For this purpose, the operation of the steering handle generates a counter torque on the steering handle 2 as a function of the speed of movement and optionally also the speed gradient by generating a damper force by means of the hand torque adjuster 4. As a result, the operating speed of the steering handle due to the driver is reduced. For a rotational movement, a damping torque M acting on the rotating element results from the multiplication of a damping constant acting on the rotating element and the steering angle speed or the speed of movement $\varphi^{\cdot}$. In use, this results in the target profile shown in FIG. 2 for the acting damper force or the damping torque M counteracting the driver as a function of the speed of movement $\varphi^{\cdot}$.

Figure 2:
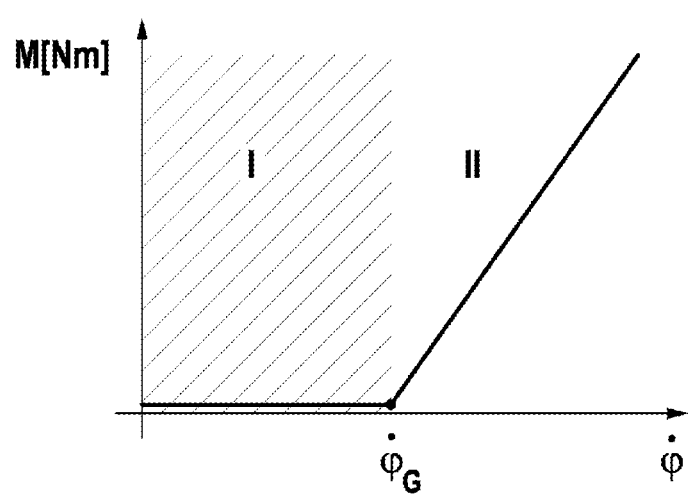
FIG. 2 shows a first exemplary embodiment of an advantageous method for operating the steering system.

FIG. 2 shows that the damping torque is only increased from a predetermined limit speed $\varphi^{\cdot}_G$. This creates a permissible range 1, within which the damping torque does not increase with increasing steering wheel angular speed or is not predetermined until the limit speed $\varphi^{\cdot}_G$ is reached. Only in the subsequent region 11 is the movement of the steering handle 2 which is induced by the driver counteracted. The variation of the torque build-up of the damping torque M can be linear or non-linear. In addition to the pure dependence on the speed of movement $\varphi^{\cdot}$ of the steering handle 2, dependencies on the vehicle speed and the gradient of the speed increase can also be taken into account as additional parameters when adjusting the damping torque M or the damper force. As an independent variable, the wheel angle movement can also be used analogously, as this can be compared between steering unit 4 and steering unit 5 without a dependence on any adjusted transmission ratio.

Figure 3:
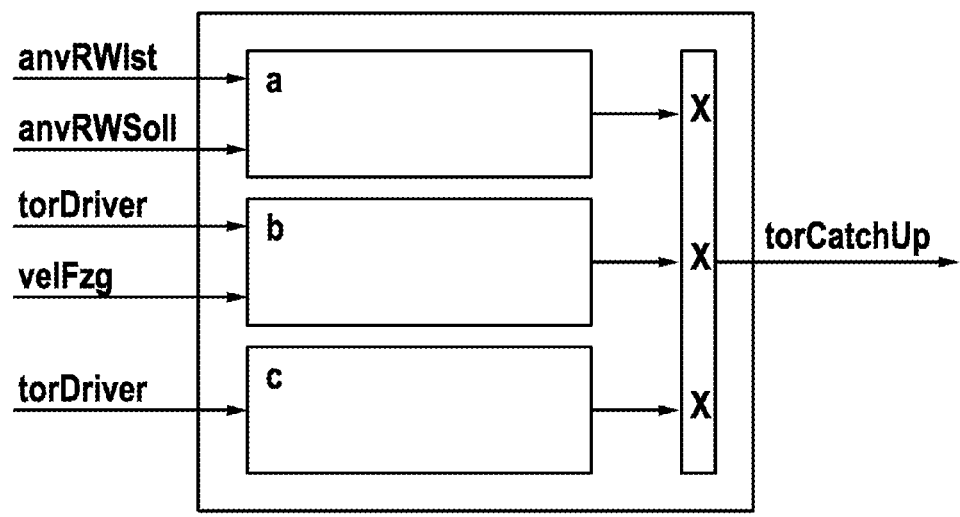
FIG. 3 shows a second exemplary embodiment of the method and FIG. 4 shows a third exemplary embodiment of the method.

FIG. 3 shows another exemplary embodiment of the method for operating the steering system 1. A so-called catch-up or capture function is realized. The capture refers to hardening, i.e. the increase in the damping force, when the power of the wheel angle adjuster does not correspond to the expected power in order to counteract the external force, i.e. the force applied by the driver. However, because the driver continues to request a steering movement, he will apply correspondingly more torque to achieve the movement despite the external force. In the case of no mechanical connection between the steering wheel 3 and the wheel angle adjuster on the wheels, the capture must be made by other means. The function described in the present case is intended to increase the input by the driver, i.e. the operating torque exerted on the steering wheel, in the event of reduced power or insufficient power of the wheel angle adjuster. In contrast to a pure damping as described earlier, the performance of the wheel angle adjuster is now also taken into account.

FIG. 3 shows the structure of the capture function for this. A first component a represents an overlay or a torque component as a function of a power loss of the wheel angle adjuster. The quality criterion is preferably the difference between the setpoint steering angle speed to be adjusted anvRWSoll and the actually present wheel steering angle speed anvRWIst. The wheel steering angle speed or the detected reduction of the available motion torque of the wheel angle adjuster can be decisive for the assessment of the power loss or the performance of the wheel angle adjuster 2. Preferably, the output signal of the component a is a continuous signal in the value range 0 to 1.

A component b represents an overlay as a function of an operating torque by the driver on the steering handle 2. Here, the operating torque torDriver exerted by the driver on the steering handle 2 is taken into account. The aim is to avoid additional damping being applied if the driver is not actively steering and has taken his hands off the steering wheel, for example. Only when there is a certain operating torque on the control element should the damping or the capture be effective in order to avoid an unintentional displacement of the steering handle. Optionally, the vehicle speed velFzg is taken into account.

Another component c represents the actual torque-forming function. By means of component c, a damping torque analogous to the damping torque described above is calculated on the basis of the speed of movement $\varphi^{\cdot}$ of the steering handle 2, which results from the applied operating torque torDriver. The damping constant is preferably specified as a function of a vehicle speed, a steering speed, a current steering wheel angle or a steering movement and the relation thereof to the neutral position of the steering handle 2. The damping constant is preferably varied depending on whether the driver deflects the steering wheel 3 further to the end stop or returns the control element to the center. The total damping torque torCatchUp results from the three components a, b, and c.

Figure 4:
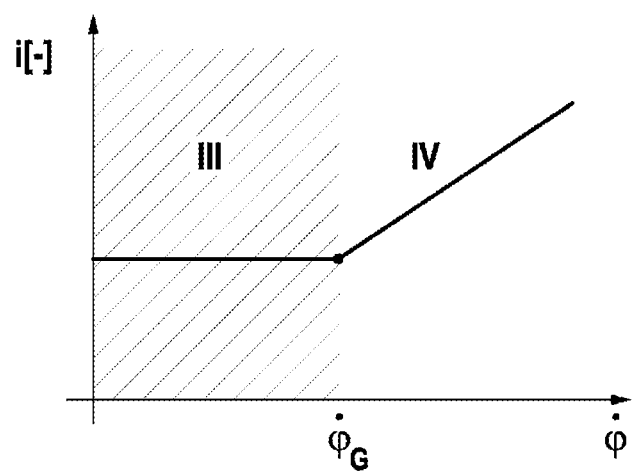

FIG. 4 shows another diagram to explain an advantageous further development of the method. A desired transmission ratio i between steering unit 5 and steering unit 6 is plotted against the setpoint wheel steering speed $\omega_{Soll}$. Basically, a calculated overall steering ratio is adjusted for steer-by-wire systems. This can be highly non-linear due to rack stroke, vehicle speed or other variables. Today's steering systems have overall steering ratios of approx. 15. This means that approx. 15° steering angles at the steering wheel 3 are required to generate a 1° wheel steering angle. An increase in the transmission ratio means that the transmission ratio becomes more indirect, i.e. the wheel steering speed is reduced for the same steering wheel angular speed.

By the present method, the steering transmission ratio i is designed to be more indirect at lower vehicle speeds. This direct transmission ratio results in the driver having to apply less effort to the steering displacement and steering speed in order to produce a corresponding wheel steering movement on the respective wheel and thus a corresponding vehicle reaction in operation. At the same time, it means that the power can no longer be related to a maximum steering wheel angular speed, since the direct transmission ratio i would make the system over dimensioned.

Preferably, on detecting a high speed of movement at the steering handle 2, the transmission ratio i between steering unit 5 and steering unit 6 is increased to allow an optimized operation of the steering system 1. An increase is preferably only allowed when deflecting, i.e. when adjusting the wheels from a neutral starting position (in straight ahead travel). The increase is also limited to a predetermined maximum value $i_{max}$ to ensure safe operation of the steering system 1. A cancelation of the virtual or indirect transmission ratio of the steering system 1 takes place, for example, when the wheel steering angle passes through zero.

Also, in the embodiment shown in FIG. 4 there is thus a region III in which the steering behavior is not affected, and a region IV in which the transmission ratio is increased. The profile preferably passes from the region III to the region VI when the predetermined limit speed $\dot{\varphi}_G$ is exceeded.

The invention claimed is:

1. A method for operating a steering system for a motor vehicle, the steering system having a steering handle configured to be operated by a driver of the motor vehicle, a hand torque adjuster that is assigned to the steering handle, and a wheel angle adjuster coupled to at least one steerable wheel of the motor vehicle, the method comprising:
  adjusting, with the wheel angle adjuster, a steering angle of the at least one steerable wheel by electronically controlling the wheel angle adjuster as a function of an operation of the steering handle by the driver;
  determining a current performance of the wheel angle adjuster as a function of at least one of (i) a difference between an adjusted actual wheel angle and a setpoint wheel angle of the at least one steerable wheel to be adjusted, (ii) a difference between a setpoint wheel steering angle speed and an actual wheel steering angle speed of the at least one steerable wheel to be adjusted, and (iii) a difference between an adjusted control torque and a setpoint torque of the wheel angle adjuster; and
  exerting, with the hand torque adjuster, a damper force on the steering handle that counteracts the operation of the steering handle by the driver, the damper force being generated as a function of the current performance of the wheel angle adjuster.

2. The method as claimed in claim 1, the exerting the damper force further comprising:
  determining the damper force as a function of an operating torque exerted on the steering handle by the driver.

3. The method as claimed in claim 1, the exerting the damper force further comprising:
  generating the damper force only when an operating torque acting on the steering handle is detected.

4. The method as claimed in claim 1, the exerting the damper force further comprising:
  determining the damper force as a function of a speed of movement of the steering handle.

5. The method as claimed in claim 4, the determining the damper force further comprising:
  increasing the damper force with increasing speed of movement of the steering handle.

6. The method as claimed in claim 5, the increasing the damper force further comprising:
  increasing the damper force one of (i) continuously and (ii) in a stepwise manner.

7. The method as claimed in claim 1, the exerting the damper force further comprising:
  determining the damper force as a function of at least one of a vehicle speed, a gradient of the speed of movement, and a wheel angle adjustment speed.

8. The method as claimed in claim 1 further comprising:
  adjusting a transmission ratio between the steering handle and the wheel angle adjuster as a function of a speed of movement of the steering handle.

9. The method as claimed in claim 8, the adjusting the transmission ratio further comprising:
  increasing the transmission ratio in response to the speed of movement of the steering handle exceeding a predetermined limit speed for the speed of movement.

10. The method as claimed in claim 8, the adjusting the transmission ratio further comprising:
  limiting the transmission ratio to a predetermined maximum value.

11. The method as claimed in claim 8, wherein the transmission ratio is increased only when the steering handle is operated to increase a wheel angle.

12. A apparatus for operating a steering system for a motor vehicle, the steering system having a steering handle configured to be operated by a driver of the motor vehicle, a hand torque adjuster that is assigned to the steering handle, and a wheel angle adjuster coupled to at least one steerable wheel of the motor vehicle, the apparatus comprising:
  at least one control unit configured to:
    control the wheel angle adjuster to adjust a steering angle of the at least one steerable wheel as a function of an operation of the steering handle by the driver;
    determine a current performance of the wheel angle adjuster as a function of at least one of (i) a difference between an adjusted actual wheel angle and a setpoint wheel angle of the at least one steerable wheel to be adjusted, (ii) a difference between a setpoint wheel steering angle speed and an actual wheel steering angle speed of the at least one steerable wheel to be adjusted, and (iii) a difference between an adjusted control torque and a setpoint torque of the wheel angle adjuster; and
    control the hand torque adjuster to exert a damper force on the steering handle that counteracts the operation of the steering handle by the driver, the damper force being generated as a function of the current performance of the wheel angle adjuster.

13. A steering system for a motor vehicle, the steering system comprising:
  a steering handle configured to be operated by a driver of the motor vehicle;
  a hand torque adjuster that is assigned to the steering handle and configured to exert a damper force on the steering handle that counteracts an operation of the steering handle by the driver;
  a wheel angle adjuster coupled to at least one steerable wheel of the motor vehicle and configured to adjust a steering angle of the at least one steerable wheel; and
  an apparatus having at least one control unit configured to:
    control the wheel angle adjuster to adjust the steering angle of the at least one steerable wheel as a function of the operation of the steering handle by the driver;
    determine a current performance of the wheel angle adjuster as a function of at least one of (i) a difference between an adjusted actual wheel angle and a setpoint wheel angle of the at least one steerable wheel to be adjusted, (ii) a difference between a setpoint wheel steering angle speed and an actual wheel steering angle speed of the at least one steerable wheel to be adjusted, and (iii) a difference between an adjusted control torque and a setpoint torque of the wheel angle adjuster; and
    control the hand torque adjuster to exert the damper force on the steering handle as a function of the current performance of the wheel angle adjuster.

* * * * *